(12) United States Patent
Haletky (10) Patent No.: US 11,151,284 B2
(45) Date of Patent: Oct. 19, 2021

(54) SYSTEM FOR ACTIVE AND PASSIVE MANAGEMENT OF LOCATION-BASED COPY DATA

(71) Applicant: Bank of America Corporation, Charlotte, NC (US)

(72) Inventor: Edward L. Haletky, Austin, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 562 days.

(21) Appl. No.: 16/237,842

(22) Filed: Jan. 2, 2019

(65) Prior Publication Data

US 2020/0210620 A1 Jul. 2, 2020

(51) Int. Cl.
| | |
|---|---|
| *G06F 21/62* | (2013.01) |
| *G06F 16/27* | (2019.01) |
| *G06N 20/00* | (2019.01) |
| *G06F 21/60* | (2013.01) |
| *G06F 16/25* | (2019.01) |
| *G06F 16/23* | (2019.01) |

(52) U.S. Cl.
CPC ...... *G06F 21/6254* (2013.01); *G06F 16/2379* (2019.01); *G06F 16/258* (2019.01); *G06F 16/27* (2019.01); *G06F 21/602* (2013.01); *G06N 20/00* (2019.01)

(58) Field of Classification Search
CPC .. G06F 21/6254; G06F 16/27; G06F 16/2379; G06F 16/258; G06F 21/602; G06N 20/00
See application file for complete search history.

(56) References Cited

U.S. PATENT DOCUMENTS

| 7,107,419 B1* | 9/2006 | Ghemawat .............. G06F 16/10 711/162 |
| 7,567,188 B1 | 7/2009 | Anglin et al. |
| 8,442,952 B1 | 5/2013 | Armangau et al. |
| 8,479,304 B1* | 7/2013 | Clifford .............. H04L 67/1097 726/29 |
| 8,539,597 B2 | 9/2013 | Arasaratnam et al. |
| 9,098,519 B2 | 8/2015 | Pavlov et al. |
| 9,361,481 B2 | 6/2016 | LaFever et al. |
| 9,373,001 B2 | 6/2016 | Cidon et al. |
| 9,589,151 B2 | 3/2017 | Deleeuw et al. |

(Continued)

FOREIGN PATENT DOCUMENTS

JP 2008166873 A * 7/2008

*Primary Examiner* — Arvin Eskandarnia
(74) *Attorney, Agent, or Firm* — Michael A. Springs; Moore & Van Allen PLLC; Seongun M. Hong (57) ABSTRACT

The present disclosure is directed to a novel system for active and passive management of location-based copy data. The system may intake user data from various data sources into a rules engine, which contains the decision logic to format the incoming data according to location-dependent rules. The system may continuously index the incoming data as well as metadata (e.g., data source, data storage location, rules associated with the data, or the like). Based on the output of the rules engine and/or index engine, an action engine may execute various processing steps to condition the data for storage in a particular system. Furthermore, the system may use passive and continuous rule updates with the process as described herein to automatically update the stored user data to conform to the new rules.

20 Claims, 4 Drawing Sheets

(56) References Cited

U.S. PATENT DOCUMENTS

| | | |
|---|---|---|
| 9,742,746 B2 | 8/2017 | Fleischman et al. |
| 9,992,231 B2 | 6/2018 | Li et al. |
| 10,089,183 B2 | 10/2018 | Sarab |
| 10,135,799 B2 | 11/2018 | Fleischman et al. |
| 10,454,901 B2 | 10/2019 | Kho et al. |
| 10,481,826 B2 | 11/2019 | Vijayan et al. |
| 10,719,625 B2 | 7/2020 | Van Dyne et al. |
| 2008/0181396 A1 | 7/2008 | Balakrishnan et al. |
| 2010/0299313 A1 | 11/2010 | Orsini et al. |
| 2012/0096567 A1 | 4/2012 | Ferris |
| 2014/0250491 A1 | 9/2014 | Fleischman et al. |
| 2018/0307859 A1 | 10/2018 | LaFever et al. |
| 2020/0104052 A1 | 4/2020 | Vijayan et al. |

\* cited by examiner

SYSTEM FOR ACTIVE AND PASSIVE MANAGEMENT OF LOCATION-BASED COPY DATA

FIELD OF THE INVENTION

The present disclosure embraces a system, controller, and computer-implemented method for active and passive management of location-based copy data. In particular, the system may use data indexing and/or decision engines to process input data from various data sources while dynamically modify stored user data according to updated rules and/or policies.

BACKGROUND

An entity may store user data across multiple data stores in multiple different locations. In such cases, there is a need for an efficient indexing and decisioning system to perform location-based data transformation.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system for active and passive management of location-based copy data. The system may intake user data from various data sources into a rules engine, which contains the decision logic to format the incoming data according to location-dependent rules. The system may continuously index the incoming data as well as metadata (e.g., data source, data storage location, rules associated with the data, or the like). Based on the output of the rules engine and/or index engine, an action engine may execute various processing steps to condition the data for storage in a particular system. Furthermore, the system may use passive and continuous rule updates with the process as described herein to automatically update the stored user data to conform to the new rules.

Accordingly, embodiments of the present disclosure provide a system for active and passive management of location-based copy data. The system may comprise a processor; a communication interface; and a memory having executable code stored thereon. The executable code, when executed by the processor, may cause the processor to receive, from a data source computing system, copy data to be processed; detect a data type of the copy data; based on the data type of the copy data and rule data, determine, via a rules engine, that one or more rules applies to the data type of the copy data; based on determining that the one or more rules applies to the data type of the copy data, generate, via the rules engine, one or more proposed actions with respect to the copy data; using an index engine, continuously append records of the copy data and metadata of the copy data to a copy data index; and execute, via an action engine, the one or more proposed actions to generate processed copy data from the copy data.

In some embodiments, the executable code further causes the processor to receive a second set of rule data; determine, via the copy data index and the second set of rule data, that an additional rule applies to the processed copy data; generate, via the rules engine, an additional set of proposed actions with respect to the processed copy data; and execute, via the action engine, the additional set of proposed actions to modify the processed copy data.

In some embodiments, the one or more proposed actions comprises redacting, re-encrypting, re-authenticating, re-factoring, or redirecting the copy data.

In some embodiments, the data type of the copy data comprises personally identifying information associated with a user, wherein the first rule requires that the personally identifying information is redacted, wherein the one or more proposed actions comprises redacting the personally identifying information.

In some embodiments, the executable code further causes the processor to detect that the copy data is encrypted copy data; retrieve, from a key manager, a key associated with the encrypted copy data; and decrypt the copy data using the key associated with the encrypted copy data.

In some embodiments, the executable code further causes the processor to receive a request from a user to download the processed copy data; retrieve, from the copy data index, a location of the processed copy data; receive authentication credentials from the user; and authorize the user to download the processed copy data.

In some embodiments, the executable code further causes the processor to use machine learning to categorize the data type of the copy data.

In some embodiments, the copy data index comprises metadata, the metadata comprising information about a source of the copy data, a target location of the copy data, rule data, and version information.

Embodiments of the present disclosure also provide a system for saving code via management of location-based copy data. The system may comprise a processor; a communication interface; and a memory having executable code stored thereon. The executable code, when executed by the processor, may cause the processor to receive, from a data source computing system, copy data to be processed; detect a data type of the copy data; identify a target application based on target metadata associated with the copy data; based on the data type of the copy data and rule data, determine, via a rules engine, that one or more rules applies to the data type of the copy data, wherein the one or more rules requires alteration of the copy data before the copy data is transferred to the target application; based on determining that the one or more rules applies to the data type of the copy data, generate, via the rules engine, one or more proposed actions with respect to the copy data, wherein the one or more proposed actions comprises performing midstream alteration of the copy data; execute, via an action engine, the one or more proposed actions to generate processed copy data from the copy data; and transfer the processed copy data to the target application, thereby preventing a need to modify code within the target application.

In some embodiments, the executable code further causes the processor to receive a second set of rule data; determine, via the copy data index and the second set of rule data, that an additional rule applies to the processed copy data; generate, via the rules engine, an additional set of proposed actions with respect to the processed copy data; and execute, via the action engine, the additional set of proposed actions to modify the processed copy data.

In some embodiments, the one or more proposed actions comprises redacting, re-encrypting, re-authenticating, re-factoring, or redirecting the copy data.

In some embodiments, the data type of the copy data is personally identifying information, wherein the one or more rules require that personally identifying information is redacted from the copy data before the copy data is transferred to the target application, wherein the midstream alteration of the copy data is a midstream redaction of the personally identifying information.

In some embodiments, the executable code further causes the processor to use machine learning to categorize the data type of the copy data.

In some embodiments, the executable code further causes the processor to detect that the copy data is encrypted copy data; retrieve, from a key manager, a key associated with the encrypted copy data; and decrypt the copy data using the key associated with the encrypted copy data.

Embodiments of the present disclosure also provide a system for using feedback loops in management of location-based copy data. The system may comprise a processor; a communication interface; and a memory having executable code stored thereon. The executable code, when executed by the processor, may cause the processor to receive, from a data source computing system, copy data to be processed; detect a data type of the copy data; based on the data type of the copy data and rule data, determine, via a rules engine, that one or more rules applies to the data type of the copy data; based on determining that the one or more rules applies to the data type of the copy data, generate, via the rules engine, one or more proposed actions with respect to the copy data; using an index engine, continuously append records of the copy data and metadata of the copy data to a copy data index; execute, via an action engine, the one or more proposed actions to generate processed copy data from the copy data; detect, over time, a change in the one or more rules; perform, via a feedback loop, re-detection of the copy data; determine, based on re-detection of the copy data, that the change in the one or more rules applies to the processed copy data; generate, via the rules engine, one or more additional proposed actions with respect to the processed copy data; recall, from the copy data index, a location of the processed copy data; and automatically perform the one or more additional proposed actions on the processed copy data.

In some embodiments, the one or more proposed actions comprises redacting, re-encrypting, re-authenticating, re-factoring, or redirecting the copy data.

In some embodiments, the data type of the copy data comprises personally identifying information associated with a user, wherein the first rule requires that the personally identifying information is redacted, wherein the one or more proposed actions comprises redacting the personally identifying information.

In some embodiments, the executable code further causes the processor to detect that the copy data is encrypted copy data; retrieve, from a key manager, a key associated with the encrypted copy data; and decrypt the copy data using the key associated with the encrypted copy data.

In some embodiments, the executable code further causes the processor to use machine learning to categorize the data type of the copy data.

In some embodiments, the copy data index comprises metadata, the metadata comprising information about a source of the copy data, a target location of the copy data, rule data, and version information.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the data management system described herein is implemented. The entity may be a business organization, a non-profit organization, a government organization, and the like, which may routinely use various types of applications within its enterprise environment to accomplish its objectives.

"Entity system" as used herein may refer to the computing systems, devices, software, applications, and/or other resources used by the entity to perform location-based data management. Accordingly, the entity system may comprise blockchain database servers, Internet-of-Things ("IoT") devices, networked terminals, smart devices (e.g., smart watches), and/or other types of computing systems or devices along with their associated applications.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like within an entity's premises. In some embodiments, the computing system may be a local or remote server which is configured to send and/or receive inputs from other computing systems on the network.

"Copy data" or "incoming data" may refer to data that is processed by the system for compliance with the rules of a particular locale. In this regard, copy data may include user-specific data, patient information, organization records, or the like.

An entity with a significant user base, such as a financial institution, may store various forms of user data in data stores in various geographic locations. In some scenarios, the user data must be altered and/or formatted according to certain rules (e.g., internal system-wide rules, legal or regulatory policies, software policies, or the like), some of which may be location-dependent. Data compliance is especially important in the context of data security and privacy, such as when the user data contains sensitive, confidential, and/or personally identifiable information ("PII"), or the like, which may require that the user data is formatted in a compliant manner with respect to the location-dependent rules that apply to the location in which said user data is stored. Furthermore, as the data rules change over time, there is a need for a way to update the data stored in the various locations to conform to the changed rules.

In this regard, the present disclosure provides a system for both active and passive management of location-based copy data. The system may be configured to pull data from various types of data sources (e.g., user databases, account databases, patient databases, or the like), where the data may contain information which is subject to one or more rules (e.g., regulatory requirements, internal or external policies, rules, laws, and/or regulations, or the like). The system may, through machine learning, detect the data elements (e.g., a person's name, address, identification numbers, photograph, biometric data, account information, or the like) which may need to be altered in order to comply with the rules. In some embodiments, the incoming data from the data source may be encrypted. In such embodiments, the system may use a key manager, which may comprise one or more cryptographic keys, to decrypt the encrypted data.

In some embodiments, the compliance rules may differ from one jurisdiction to another. For instance, data security regulations in China may have different requirements when compared to data security regulations in Switzerland. Accordingly, the data stored in one location within the entity system may require that the data is formatted differently from data stored in a second location. In this regard, the system may comprise a rules engine which may contain the decision code or logic used to determine how the data should be formatted to comply with the relevant rules.

The rules engine may collect metadata associated with the incoming data (e.g., rules that apply to the incoming data, data source location, data target location, data types, or the like), from various data feeds, such as authentication sources, security group sources, or the like. As rules are updated or changed over time, the rules engine may apply the updated rules to the data to be processed. Based on the rules that apply at the data target location, the rules engine may use decisioning logic to determine how the incoming data should be formatted. For example, if the rules of the target location require that PII (e.g., social security numbers) should not be stored at the target location under certain circumstances (e.g., when the target database is accessible to entities other than the user, such as an employee of the entity), the rules engine may determine that such PII should be redacted from the incoming data before being stored at the target location. In other embodiments, the rules of the target location may require that the incoming data is made available for download to the user associated with the incoming data. In such embodiments, the rules engine may determine that data including PII may be stored in a private, user-specific database at the target location.

The system may further comprise an index engine which may continuously track and log data and/or metadata processed by the system. In particular, the system may create logs of the types of incoming data (e.g., user data), data sources, data target locations, metadata, actions proposed by the rules engine vs. actions taken, and the like. In some embodiments, the index engine may track not only the current state of the incoming data, but may also comprise a complete history of changes to certain processed data over a period of time. In this way, the index engine provides a way to determine the state of data stored in various locations may be known for any given point in time. For instance, the index engine may be used to determine the state of user data within a particular location at a particular point in time for auditing and/or eDiscovery purposes.

While the index engine may be used to actively catalogue incoming data, the system also provides a way to passively process data stored in various locations. As the rules of particular locations change over time, the index created by the index engine may be used to precisely determine the locations of stored data as well as the nature of the data stored therein. In this way, the index may provide a way to redetect the data type and generate new proposed actions using the rules engine in order to comply with the new rules. In this way, the system provides a passive feedback loop which may allow the stored data to automatically be updated based on location-dependent rules.

Finally, the system may further comprise an action engine which may execute the proposed actions generated by the rules engine. The proposed actions may include the redaction or modification of data elements, storage and/or redirection of data, tokenization or reencryption of data, authentication and/or reauthentication, fulfillment of download requests by the user, or the like. In an exemplary embodiment, the incoming data may be user account information to be stored in a first location, which may be subject to a first set of rules. The first set of rules may require that the PII of the user must be redacted before being stored at the first location. In such an embodiment, the system may detect the PII data elements from the user data, determine a set of proposed actions using the rules engine, create a log associated with the data or metadata using the index engine, and execute the proposed actions using the action engine. In some embodiments, such processing of data may be conducted in real time such that certain actions (e.g., redaction of PII) may occur mid-stream. This may prove advantageous, for instance, in scenarios in which local rules prohibit the storage of PII at the location at any time.

The system as disclosed herein addresses a number of technology-centric challenges associated with processing copy data based on jurisdictional requirements. By using the active data management functions as described herein, the system may be able to alter the functionality of applications within a certain location without changing the underlying code of the application. For example, if a location requires that PII is not stored at the location at any time, then the PII may be redacted from incoming user data mid-stream such that the local applications (e.g., an agent's terminal application) never receives the PII. In this way, the system prevents the need to undergo the resource-intensive process of modifying the local application's code. Furthermore, by providing a passive feedback process for updating data stored in various different jurisdictions which may each have specific data storage and/or processing rules, the system provides a way of continuously and automatically maintaining compliance of large amounts of data in an efficient manner.

Figure 1:
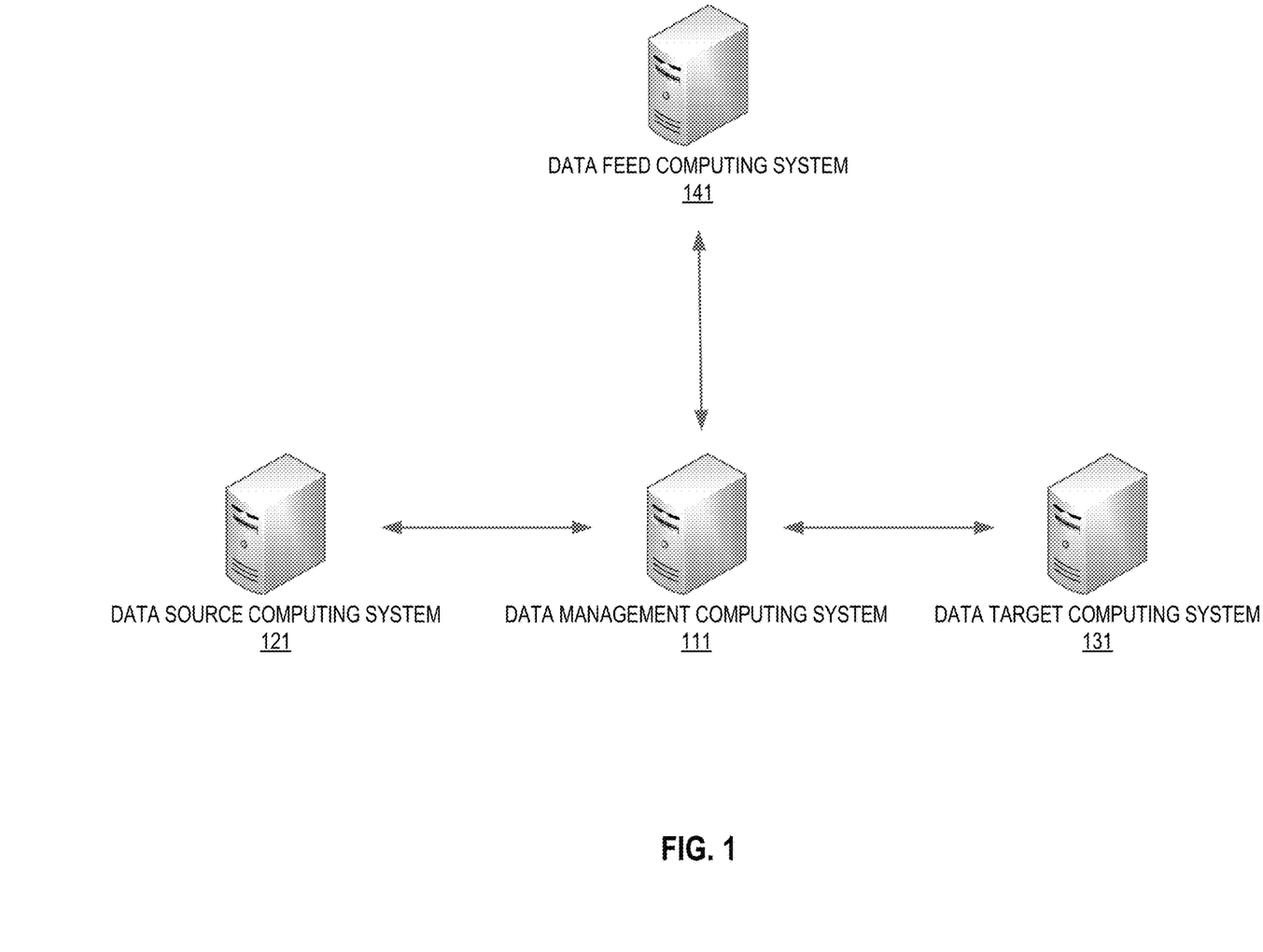
FIG. 1 is a block diagram illustrating an operating environment for the data management system, in accordance with some embodiments of the present disclosure.

Turning now to the figures, FIG. 1 is a block diagram illustrating an operating environment for the data management system, in accordance with some embodiments of the present disclosure. In particular, the operating environment may include a data management computing system 111 in operative communication with a data source computing system 121, a data target computing system 131, and a data feed computing system 141 over a network. The network, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The data management computing system 111 may be owned and/or operated by an entity which may collect data from the data source computing system 121 and/or the data feed computing system 141 for storage on the data target computing system 131. In this regard, the data target computing system 131 may also be owned and/or operated by an entity. Typically, the data management computing system 111 and the data target computing system 131 are networked servers within the control of the entity. That said, it is within the scope of the disclosure for the data management computing system 111 and/or the data target computing system 131 to be user computing devices (e.g., smartphones, desktop computers, laptop computers, IoT devices, wearable smart devices, stationary smart devices, or the like). In some embodiments, the data management computing system 111 may further comprise a copy data index which comprises records of all of the copy data processed by the system, where the records may include copy data source, copy data storage locations, proposed actions and actions executed, processing timelines, and the like.

The data source computing system 121 may host the copy data to be processed by the data management computing system 111. In this regard, the data source computing system 121 may be the entity's client database, which may contain client user information (e.g., account information, biographical information, or the like). The data source computing system 121 may also be a user computing system operated by a client of the entity (e.g., a personal computer of the client), which may then be used as a direct source of user-related information by the data management computing system 111. In other embodiments, the data source computing system 121 may be a third party data server owned and/or operated by a third party entity (e.g., a service provider, insurance company, regulatory agency, or the like). In some embodiments, the data management computing system 111 may also collect copy metadata in addition to copy data, where the metadata may include information such as the data source location, the data type, data target location, or the like.

The data feed computing system 141 may serve metadata to the data management computing system 111 to be used in the copy data management processes. For instance, the data feed computing system 141 may contain information about rules, regulations, laws, industry standards, policies, security concerns, or the like, which may concern the copy data to be processed by the data management computing system 111. In some embodiments, the rule information may be target-dependent in that the rules may change according to the location or jurisdiction in which the data target computing system 131 is located. For example, if the data target computing system 131 is located in Japan, then the rule information obtained from the data feed computing system 141 may relate to Japanese laws, rules, regulations, policies, or the like regarding data processing and/or storage.

As noted above, the data target computing system 131 is typically owned and/or operated by the entity, though it is within the scope of the disclosure for the data target computing system 131 to be owned and/or operated by the user or other third party. The copy data may be processed by the data management computing system 111 based on the data rules that apply in the jurisdiction in which the data target computing system 131 is located. Once the copy data has been processed, the data management computing system 111 may store the rule compliant copy data on the data target computing system 131.

It should be understood by those having ordinary skill in the art that although the computing systems as shown in FIG. 1 are depicted as single units, each of the depicted components, or sub-components therein, may represent multiple units. For instance, although the data target computing system 131 is depicted as a single computing system, the data target computing system 131 may represent multiple data target computing systems that may be located in different jurisdictions or locations. As another example, the data management computing system 111 may represent multiple entity-owned computing system working in a distributed manner to execute the functions of the entity data management system, which may include an index computing system which houses the copy data index. In other embodiments, the functions of multiple computing systems may be accomplished by a single system. For instance, in some embodiments, the one or more functions of the data management computing system 111 and the data feed computing system 141 may be accomplished by the data management computing system 111 (e.g., metadata and/or rule information may be stored on the data management computing system 111 instead of an external server or data feed).

Figure 2:
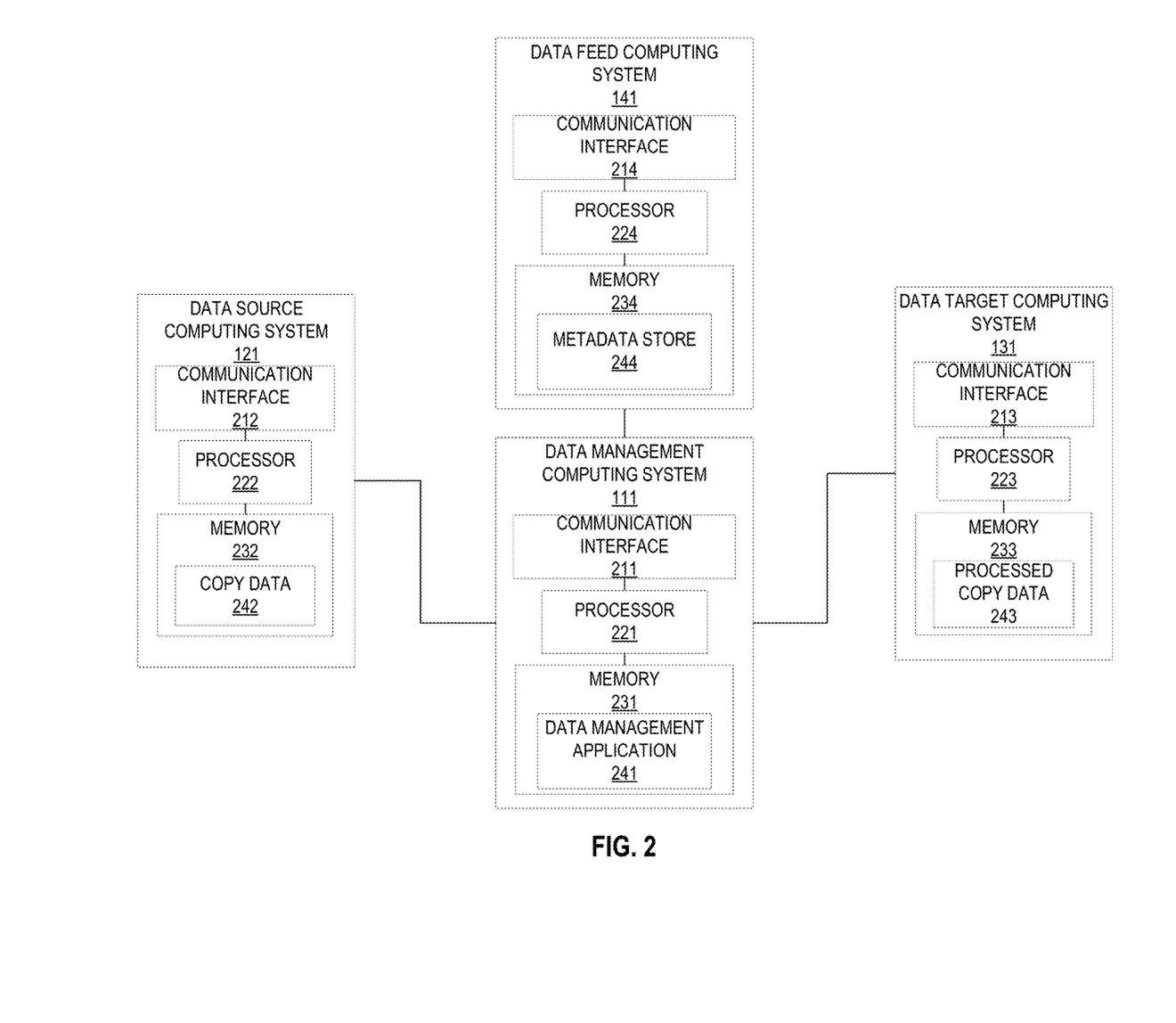
FIG. 2 is a block diagram illustrating the data management computing system, the data source computing system, the data target computing system, and the data feed computing system in more detail, in accordance with some embodiments of the present disclosure.

FIG. 2 is a block diagram illustrating the data management computing system 111, the data source computing system 121, the data target computing system 131, and the data feed computing system 141 in more detail, in accordance with some embodiments of the present disclosure. The data management computing system 111 may comprise a processor 221 communicably coupled to such devices as a communication interface 211 and a memory 231. The processor 221, and other processors described herein, typically includes circuitry for implementing communication and/or logic functions of the computing systems or devices as described herein. For example, the processor 221 may include a digital signal processor device, a microprocessor device, and various analog to digital converters, digital to analog converters, and/or other support circuits. The data management computing system 111 may use the communication interface 211 to communicate with other devices over the network. The communication interface may be an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 231 of the data management computing system 111 may comprise a data management application 241. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The data management application 241 may comprise executable code for the functions and processes of the data management system. In particular, the data management application 241 may contain the logic needed for the data management computing system 111 to process data and/or metadata received from the data source computing system 121 and/or the data feed computing system 141. Furthermore, in some embodiments, the data management application 241 may comprise the logic needed to continuously index the data processed by the system as well as the copy data index itself. In other embodiments, the copy data index may be stored on an external server owned and/or operated by the entity.

The data source computing system 121 may also comprise a processor 222 communicatively coupled with such devices as a communication interface 212 and a memory 232. The memory 232 may comprise copy data 242, which is the data to be processed by the data management system. Accordingly, the copy data 242 may include user-specific information such as account information, biographical information, medical history data, other types of PII, or the like.

In some embodiments, the data source computing system 121 may be a device owned and/or operated by the user, who may be a client of the entity. In such embodiments, the data source computing system 121 may further comprise a user interface, which may comprise the hardware and software implements to accept input from and provide output to the user. The user interface may comprise hardware such as a display, audio output devices, projectors, and the like, or input devices such as keyboards, mice, sensors, cameras, microphones, biometric input devices (e.g., fingerprint readers), and the like. The user interface may further comprise software such as a graphical or command-line interface through which the user may provide inputs and/or receive outputs. It should be understood that the display on which the user interface is presented may include an integrated display (e.g. a tablet or smartphone screen) or an external display device (e.g. a computer monitor or television).

The data target computing system 131 may also comprise a communication interface 213, a processor 223, and a memory 233 having processed copy data 243 stored thereon. The processed copy data 243 may include copy data 242 which has been modified by the data management computing system 111 to be compliant with the rules associated with where the data target computing system 131 is located. In this regard, the processed copy data 243 may include copy data with user-specific PII removed, copy data in a particular format, or the like.

The data feed computing system 141 may also comprise a communication interface 214, a processor 224, and a memory 234 comprising a metadata store 244. The metadata store 244 may comprise information on rules that may apply to the copy data 242, such as jurisdiction-dependent laws or regulations, security policies, authentication policies, and the like. The data management computing system 111 may pull information from the metadata store 244 into the rules engine to determine how the copy data 242 should be processed.

Figure 3:
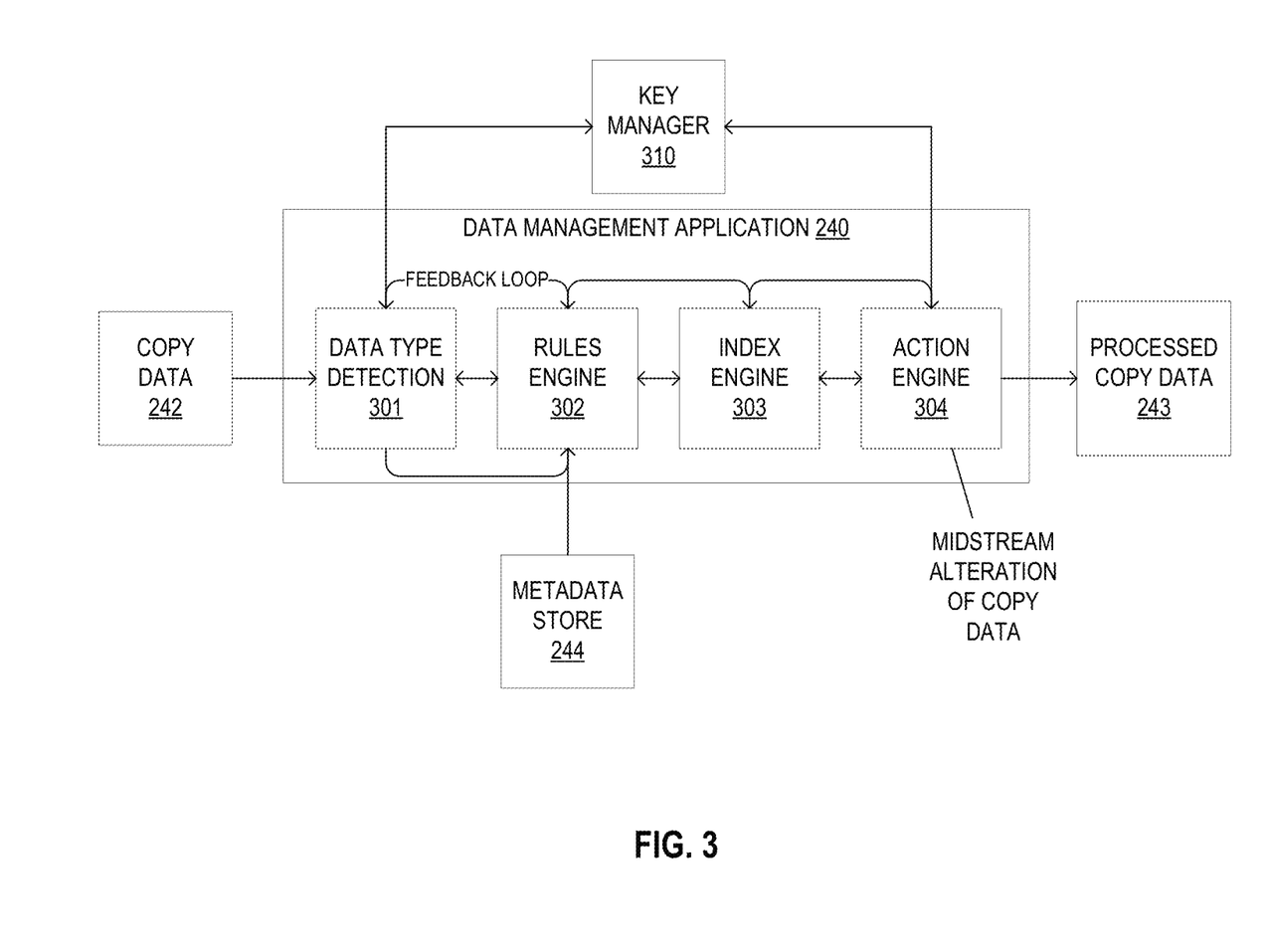
FIG. 3 is a block diagram illustrating the logical structures within the data management system, in accordance with some embodiments of the present disclosure.

FIG. 3 is a block diagram illustrating the logical structures within the data management system, in accordance with some embodiments. In particular, FIG. 3 depicts the components and data flow within the data management application 240. The data management application 240 may pull the copy data 242 for data type detection, as seen in block 301. As described above, the copy data 242 may comprise user data with confidential or sensitive information, such as user account numbers, biographical information, medical information, or other kinds of PII which may be subject to various rules depending on the location in which the copy data 242 is to be stored. In other embodiments, the copy data 242 may include other types of data which may be subject to jurisdictional rules, such as copy data related to an entity such as a business organization. At this stage, the data management application 242 may use artificial intelligence ("AI") and/or machine learning functions to automatically detect the data portions or fields which correspond to the a user's PII. For instance, the data management application 242 may, over time, learn to recognize a user's social security number, account number, business accounting records, trade secrets, privileged documents, or the like. In this way, the system may learn to accurately and automatically detect data elements that may require modification to ensure compliance with relevant rules.

In some embodiments, the copy data 242 received by the data management application 240 may be encrypted via a particular encryption algorithm (e.g., RSA, AES, or the like) which must first be decrypted in order to be processed. In such embodiments, the data management application 240 may use a key manager 310, where the key manager 310 comprises one or more keys (e.g., cryptographic keys) which correspond to the various types of encrypted data to be decrypted. Accordingly, a key within the key manager 310 may be used to decrypt any incoming encrypted copy data 242 so that it may be processed as described herein.

Once the relevant data elements have been detected, the copy data 242 may be processed by the rules engine 302. The rules engine 302 may import metadata associated with the copy data 242 (e.g., data source, data target location or jurisdiction, data type, authentication data, or the like) as well as rule information (e.g., data on laws, rules, and/or regulations relevant to the location or jurisdiction of the data target location, an entity's internal data processing policies, or other types of policies or rules as may be set by the system) from a metadata store 244. Based on the metadata and the rule information, the rules engine may use decisioning logic to generate one or more proposed actions. For instance, the rules engine may determine that the rules associated with the data target's location require that certain types of information within the copy data 242 (e.g., user account information) must be redacted or altered before the copy data 242 is stored at the target location. In such embodiments, the rules engine may create a proposed action for redacting the relevant portions of the copy data 242. In another embodiment, the rules engine may determine that the copy data 242 should be encrypted using a particular method or algorithm. In such embodiments, the rules engine may create a proposed action for encrypting the copy data 242 using an encryption key within the key manager.

Subsequently and/or in parallel to the processes described above, the data management application 240 may use an index engine 303 to continuously index the data management process. For instance, the index engine 303 may track information about the copy data 242 such as the data source or data type, the data target location, which rules apply to the copy data, where the copy 242 was ultimately stored, what actions were proposed with respect to the copy data 242 by the rules engine 302, what actions were eventually taken on the copy data 242, and the like, over a period of time to be stored in a copy data index. As a result, the copy data index generated by the index engine 303 may contain a detailed history of the copy data processed by the data management application 240. Accordingly, the copy data index may be used for auditing purposes, eDiscovery of data locations, or may be subsequently used to passively update copy data according to changes in rules or policies over time. Some of the data within the copy data index may be read-only or immutable and thus unable to be modified, while other types of data within the copy data index may be modifiable and/or support versioning.

Finally, the action engine 304 may use the proposed actions generated by the rules engine 302 and the information within the index engine 303 to execute one or more of the proposed actions. Once the proposed actions have been executed to conform the copy data 242 to comply with the relevant rules, the action engine 304 may generate processed copy data 243 from the copy data 242 and subsequently store the processed copy data 243 in the target location.

In an exemplary embodiment, a proposed action may be the redaction of certain data fields within the copy data 242. In such embodiments, the action engine 304 may execute the redaction of the specified data fields. In other embodiments, the proposed action may be re-encryption of the copy data 242 using an encryption algorithm that complies with relevant rules (e.g., the rules of a particular location may require that certain data is encrypted to meet a specific encryption standard). In such embodiments, the action engine 304 may use the key manager 310 to encrypt the unencrypted copy data 242. In yet other embodiments, a proposed action may be the fulfillment of a download request submitted by the user. For instance, local rules may require that a user is provided download access to the user's personal information. In such embodiments, the action engine 304 may receive authentication credentials (e.g., username and password, biometric data, secured token, or the like) from the user and authorize the user to download the processed copy data 243 according to the location as stored in the copy data index. Alternatively, the action engine 304 may use the copy data index to recreate an unredacted copy of the copy data 242 expressly for the purpose of allowing the user to download a full copy of the user's information.

Over time, the rules with respect to particular types of data and/or with respect to treatment of data in particular locations my change. For example, a rule that once required data to be encrypted according to one algorithm may be changed to require the data to be encrypted according to a new, more secure algorithm. In other embodiments, rules may change to add more types of information to the classification of "PII." In such cases, data stored within the entity servers may fall out of compliance upon implementation of the new rules. Accordingly, the data management system 240 may detect the change in rules and subsequently reference the copy data index to determine which types of data may be affected by the change in rules. Once the affected data has been identified, the rules engine 302 may be used to generate additional proposed actions to modify the affected data to comply with the change in rules. Once the proposed actions are generated, the action engine 304 may execute the proposed actions, which will then bring the affected data into compliance. By operating in a feedback loop as described above, the data management application 240 may provide a passive method of automatically and continuously updating stored copy data even if rules affecting the copy data may change over time.

In some embodiments, the alteration of copy data 242 may occur in midstream such that the target source does not receive an unaltered copy of the copy data 242. In this way, the system provides a way to alter the functionality of the endpoint applications within the entity system without changing the code of the applications. For example, rather than specifically coding an application to remove sensitive information from the copy data, the system may perform such operations midstream such that the application may receive the processed copy data 243 and treat the processed copy data 243 according to its already existing code, thereby saving precious resources that would otherwise be needed to re-program the application.

Figure 4:
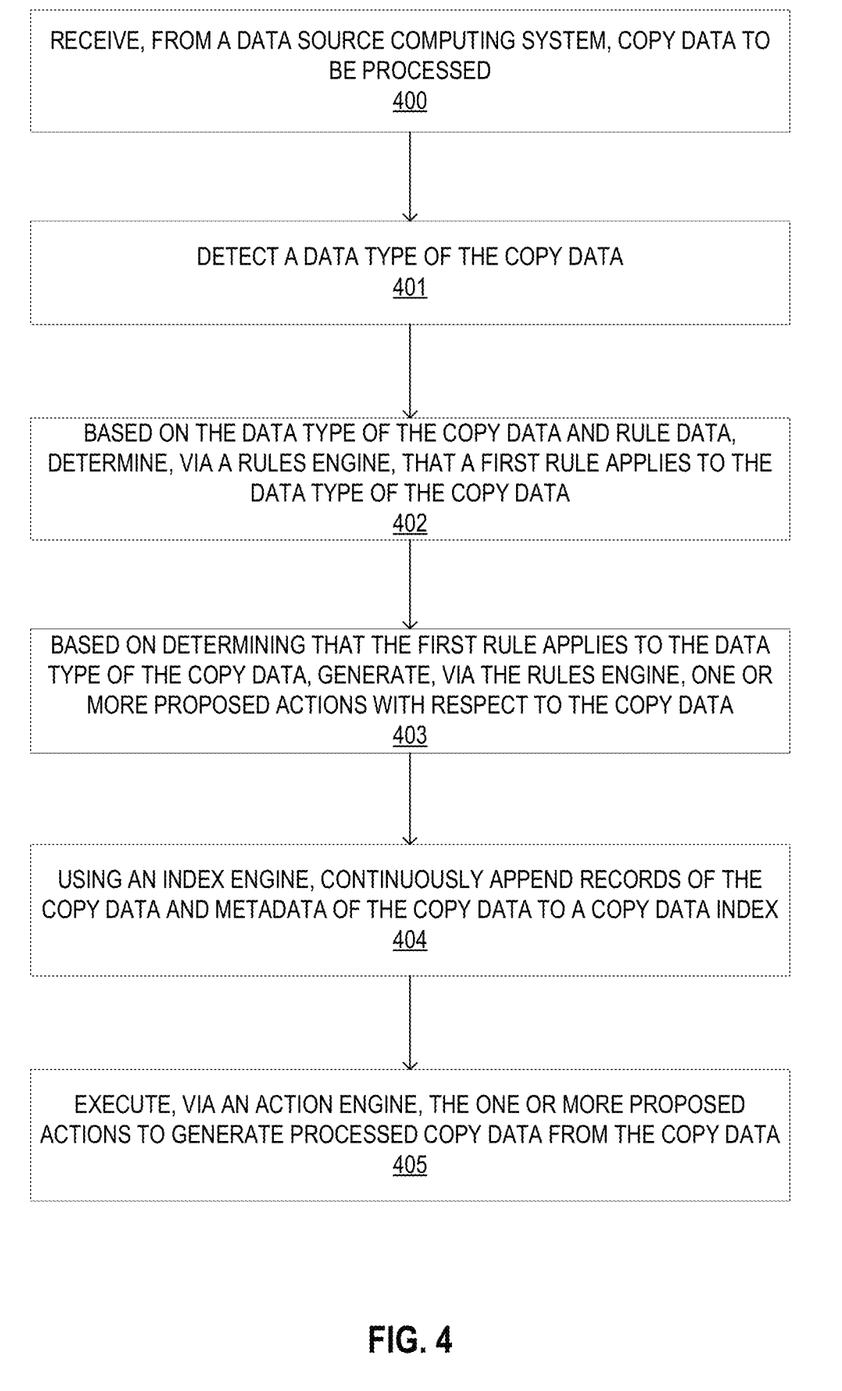
FIG. 4 is a process flow for managing jurisdictional copy data, in accordance with some embodiments of the present disclosure.

FIG. 4 is a process flow for managing jurisdictional copy data, in accordance with some embodiments of the present disclosure. The process begins at block 400, where the system receives, from a data source computing system, copy data to be processed. In some embodiments, the copy data may contain confidential or sensitive information about a user. In such embodiments, the data source computing system may be a user-related data server within an entity system or a user computing system associated with the user to which the confidential information relates. In some embodiments, the copy data to be processed may be encrypted. In such embodiments, the system may, using a key manager, decrypt the encrypted copy data.

The process continues to block 401, where the system detects a data type of the copy data. In some embodiments, the data type may represent a particular field or type of information regarding the user. For instance, the data type may be an account number, biographical information, medical history information, identification numbers, or other types of PII associated with the user. In some embodiments, the system may use artificial intelligence and/or machine learning to automatically detect certain data types, such as data types categorized as PII.

The process continues to block 402, where the system, based on the data type of the copy data and rule data, determines, via a rules engine, that a first rule applies to the data type of the copy data. The rules engine may receive rule data which relates to various types of rules, regulations, laws, and/or policies which may concern the data type of the copy data. For instance, the rule data may contain information about jurisdictional rules or laws, agency regulations, internal company policies, software policies, or the like. In an exemplary embodiment, a rule of the jurisdiction in which the copy data is to be stored may require that certain types of PII (e.g., medical information) are not stored in the jurisdiction. In such embodiments, the rules engine may identify the data types (e.g., which types of PII) to which the jurisdictional rule applies.

The process continues to block 403, where the system, based on determining that the first rule applies to the data type of the copy data, generates, via the rules engine, one or more proposed actions with respect to the copy data. The proposed actions may depend on the rules with which the copy data must comply. Continuing the above example, if the jurisdictional rule requires that medical information is not stored within the bounds of the jurisdiction, then a proposed action may be a proposal to redact the relevant data types (e.g., medical information) from the copy data before it is stored in a data server within the jurisdiction.

The process continues to block 404, where the system, using an index engine, continuously appends records of the copy data and metadata of the copy data to a copy data index. Over time, the system may constantly record information such as the nature of the copy data, the copy data source, the data target location, the rules which apply to the data target location, which actions were proposed and/or taken with respect to the copy data, copy data version information, read/write permissions, and the like.

The process concludes at block 405, where the system executes, via an action engine, the one or more proposed actions to generate processed copy data. In some embodiments, the proposed actions may be executed mid-stream such that the copy data is modified before it is stored at the target location. For instance, the action engine may ensure that PII is redacted from the copy data before it is stored in the jurisdiction of the target location. In some embodiments, the action executed may also include a re-encryption of the unencrypted copy data before storage at the target location.

In some embodiments, the system may further determine that the rule data has changed (e.g., a new rule requires additional types of information to be redacted). The system may, based on detecting that the rule data has changed, use the copy data index to determine that the processed copy data is affected. The system may then automatically generate a second set of proposed actions to modify the processed copy data and use the action engine to execute the second set of proposed actions.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for active and passive management of location-based copy data, comprising:
   a processor;
   a communication interface; and
   a memory having executable code stored thereon, wherein the executable code, when executed by the processor, causes the processor to:
   receive, from a data source computing system, copy data to be processed;
   detect a data type of the copy data;
   based on the data type of the copy data and rule data, determine, via a rules engine, that one or more rules applies to the data type of the copy data;
   based on determining that the one or more rules applies to the data type of the copy data, generate, via the rules engine, one or more proposed actions with respect to the copy data;
   using an index engine, continuously append records of the copy data and metadata of the copy data to a copy data index; and
   execute, via an action engine, the one or more proposed actions to generate processed copy data from the copy data.

2. The system of claim 1, wherein the executable code further causes the processor to:
   receive a second set of copy data;
   determine, via the copy data index and the second set of copy data, that an additional rule applies to the processed copy data;
   generate, via the rules engine, an additional set of proposed actions with respect to the processed copy data; and
   execute, via the action engine, the additional set of proposed actions to modify the processed copy data.

3. The system of claim 1, wherein the one or more proposed actions comprises redacting, re-encrypting, re-authenticating, re-factoring, or redirecting the copy data.

4. The system of claim 1, wherein the data type of the copy data comprises personally identifying information associated with a user, wherein a first rule requires that the personally identifying information is redacted, wherein the one or more proposed actions comprises redacting the personally identifying information.

5. The system of claim 1, wherein the executable code further causes the processor to:
   detect that the copy data is encrypted copy data;
   retrieve, from a key manager, a key associated with the encrypted copy data; and
   decrypt the copy data using the key associated with the encrypted copy data.

6. The system of claim 1, wherein the executable code further causes the processor to:
   receive a request from a user to download the processed copy data;
   retrieve, from the copy data index, a location of the processed copy data;
   receive authentication credentials from the user; and
   authorize the user to download the processed copy data.

7. The system of claim 1, wherein the executable code further causes the processor to use machine learning to categorize the data type of the copy data.

8. The system of claim 1, wherein the copy data index comprises metadata, the metadata comprising information about a source of the copy data, a target location of the copy data, rule data, and version information.

9. A system for saving code via management of location-based copy data, comprising:
   a processor;
   a communication interface; and
   a memory having executable code stored thereon, wherein the executable code, when executed by the processor, causes the processor to:
   receive, from a data source computing system, copy data to be processed;
   detect a data type of the copy data;
   identify a target application based on target metadata associated with the copy data;
   based on the data type of the copy data and rule data, determine, via a rules engine, that one or more rules applies to the data type of the copy data, wherein the one or more rules requires alteration of the copy data before the copy data is transferred to the target application;
   based on determining that the one or more rules applies to the data type of the copy data, generate, via the rules engine, one or more proposed actions with respect to the copy data, wherein the one or more proposed actions comprises performing midstream alteration of the copy data;
   execute, via an action engine, the one or more proposed actions to generate processed copy data from the copy data; and
   transfer the processed copy data to the target application, thereby preventing a need to modify code within the target application.

10. The system of claim 9, wherein the executable code further causes the processor to:
receive a second set of rule data;
determine, via a copy data index and the second set of rule data, that an additional rule applies to the processed copy data;
generate, via the rules engine, an additional set of proposed actions with respect to the processed copy data; and
execute, via the action engine, the additional set of proposed actions to modify the processed copy data.

11. The system of claim 9, wherein the one or more proposed actions comprises redacting, re-encrypting, re-authenticating, re-factoring, or redirecting the copy data.

12. The system of claim 9, wherein the data type of the copy data is personally identifying information, wherein the one or more rules require that personally identifying information is redacted from the copy data before the copy data is transferred to the target application, wherein the midstream alteration of the copy data is a midstream redaction of the personally identifying information.

13. The system of claim 9, wherein the executable code further causes the processor to use machine learning to categorize the data type of the copy data.

14. The system of claim 13, wherein the executable code further cause the processor to:
detect that the copy data is encrypted copy data;
retrieve, from a key manager, a key associated with the encrypted copy data; and
decrypt the copy data using the key associated with the encrypted copy data.

15. A system for using feedback loops in management of location-based copy data, comprising:
a processor;
a communication interface; and
a memory having executable code stored thereon, wherein the executable code, when executed by the processor, causes the processor to:
receive, from a data source computing system, copy data to be processed;
detect a data type of the copy data;
based on the data type of the copy data and rule data, determine, via a rules engine, that one or more rules applies to the data type of the copy data;
based on determining that the one or more rules applies to the data type of the copy data, generate, via the rules engine, one or more proposed actions with respect to the copy data;
using an index engine, continuously append records of the copy data and metadata of the copy data to a copy data index;
execute, via an action engine, the one or more proposed actions to generate processed copy data from the copy data;
detect, over time, a change in the one or more rules;
perform, via a feedback loop, re-detection of the copy data;
determine, based on re-detection of the copy data, that the change in the one or more rules applies to the processed copy data;
generate, via the rules engine, one or more additional proposed actions with respect to the processed copy data;
recall, from the copy data index, a location of the processed copy data; and
automatically perform the one or more additional proposed actions on the processed copy data.

16. The system of claim 15, wherein the one or more proposed actions comprises redacting, re-encrypting, re-authenticating, re-factoring, or redirecting the copy data.

17. The system of claim 15, wherein the data type of the copy data comprises personally identifying information associated with a user, wherein a first rule requires that the personally identifying information is redacted, wherein the one or more proposed actions comprises redacting the personally identifying information.

18. The system of claim 15, wherein the executable code further causes the processor to:
detect that the copy data is encrypted copy data;
retrieve, from a key manager, a key associated with the encrypted copy data; and
decrypt the copy data using the key associated with the encrypted copy data.

19. The system of claim 15, wherein the executable code further causes the processor to use machine learning to categorize the data type of the copy data.

20. The system of claim 15, wherein the copy data index comprises metadata, the metadata comprising information about a source of the copy data, a target location of the copy data, rule data, and version information.

* * * * *